Patented Nov. 10, 1936

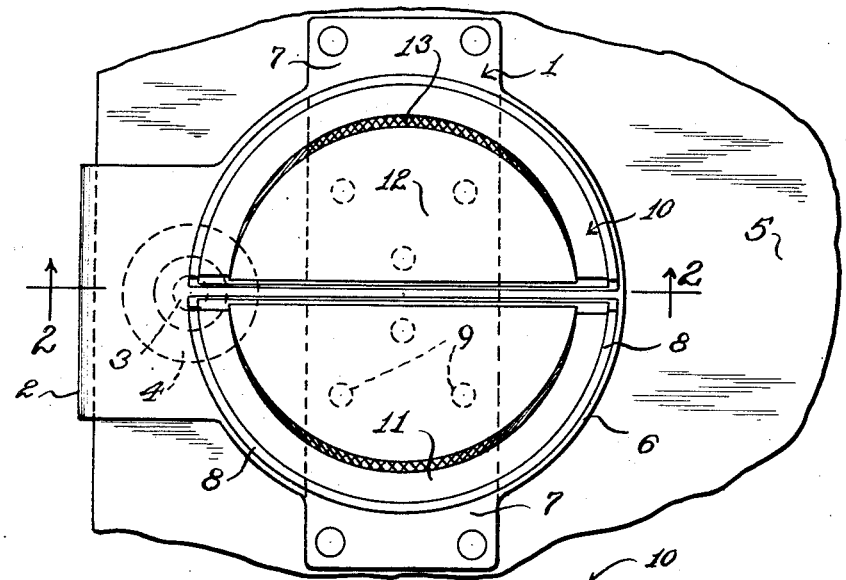
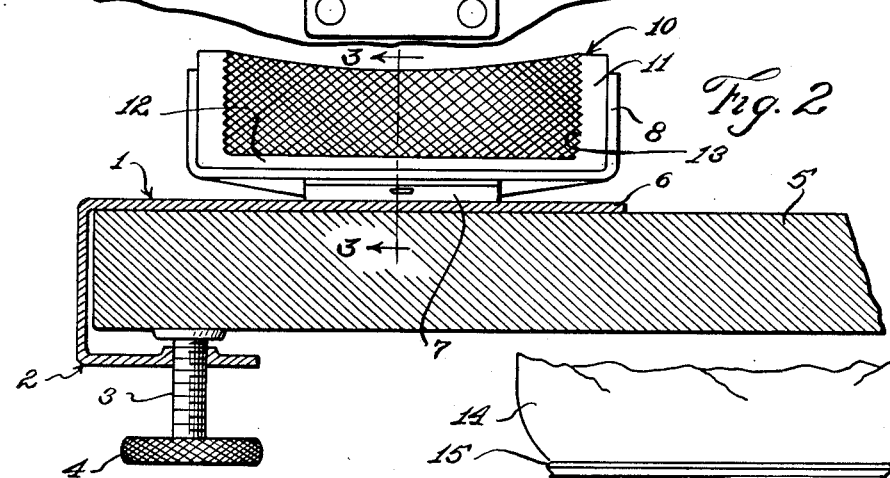
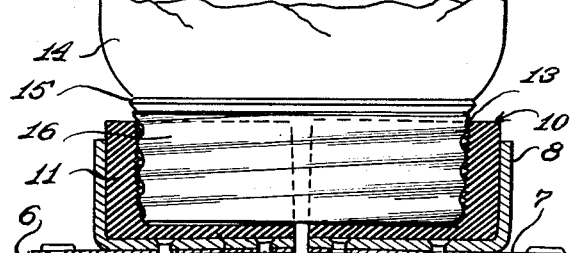
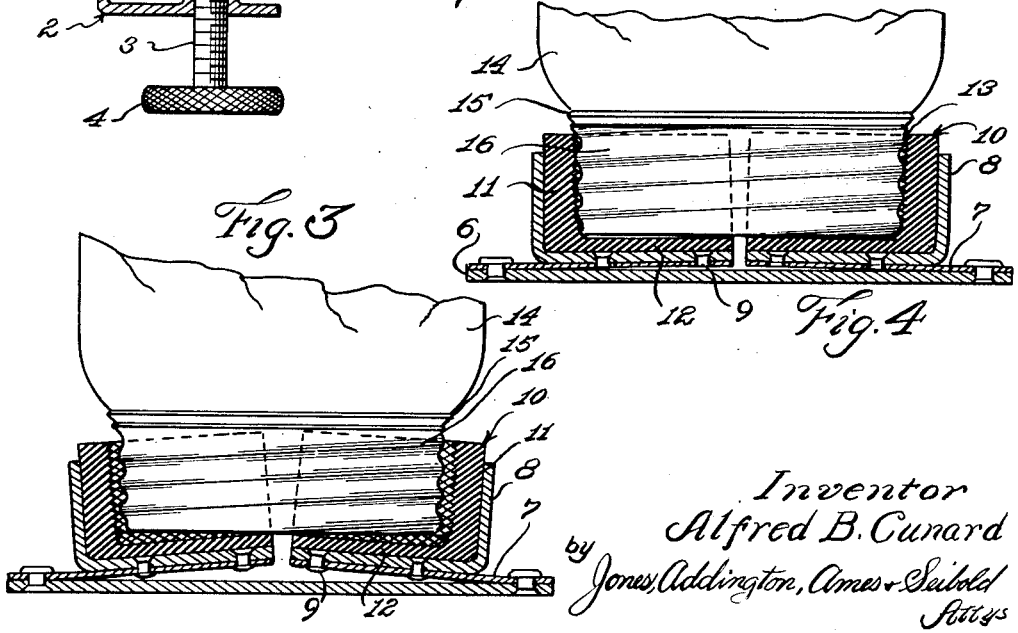

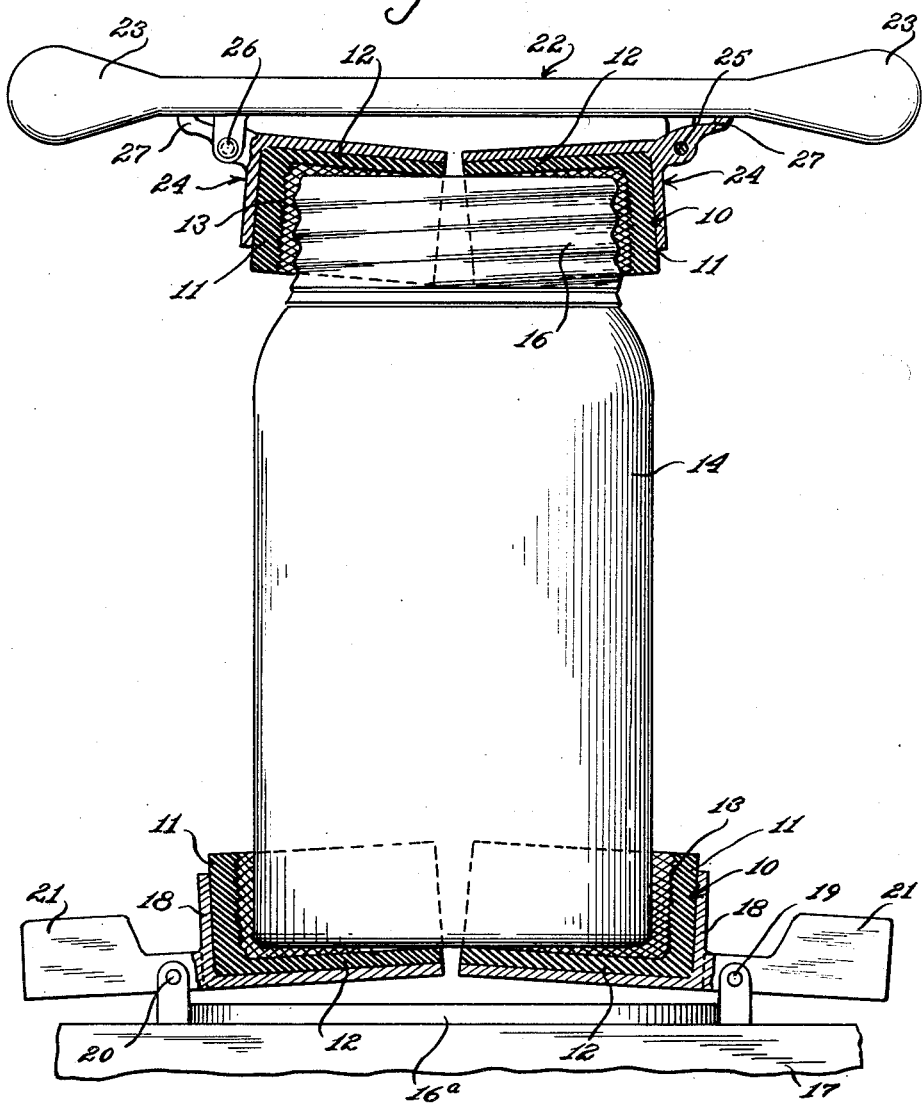

2,060,726

UNITED STATES PATENT OFFICE 2,060,726

APPARATUS FOR USE WITH CONTAINER COVERS

Alfred B. Cunard, Hobart, Ind., assignor of one-half to Alfred P. Draper, Gary, Ind.

Application August 14, 1935, Serial No. 36,129

6 Claims. (Cl. 81—3.1)

This invention relates to apparatus for use with container covers, with particular reference to apparatus for tightening or loosening the screw covers of glass fruit jars or cans similar to those commonly known as "Mason jars."

In the ordinary process of home-canning, it is common practice to fill the glass jars and then put on the usual rubber gasket and screw on the cap as snugly as possible, then invert the jars and allow them to remain in that position until upon examination it is believed that they are perfectly sealed.

The present invention contemplates the provision of a semi-automatic clamping device in which the cover of the can may be inserted and will be snugly clamped by longitudinal pressure on the can. Turning the can while the longitudinal pressure is applied causes the cap to be snugly sealed.

One of the objects of my invention is to provide apparatus for use with screw top containers in which the jaws will be brought into gripping engagement, either with the container or the screw cap, by the mere act of placing the apparatus and container or cap in operative relation with respect to each other.

A further object is to provide such apparatus in which relative axial movement of the apparatus with respect to the container or cap will cause the jaws to engage the sides of the container or cap.

It is another object of the invention to provide a device of a semi-automatic type in which the can covers are snugly clamped by a resilient material and in which no metal comes in contact with the can cover, thereby preventing any injury to the cover or breakage of the can by uneven pressure in the tightener.

It is a further object to provide a can cover tightener of the character described which may be used in either inverted or upright position, and in which there is no requirement for manual manipulation of anything except the container.

Another object is the provision of an efficient semi-automatic can cover tightener which will be of few parts, cheap to manufacture, and which will not easily get out of order.

It will be apparent that, while the invention is particularly desirable for glass jars of the so-called "Mason" type, it is adaptable for use with any type of container having a screw cover.

Further objects will be apparent from the specification and the appended claims.

In the drawings:

Figure 1 is a top plan view of one embodiment of the invention clamped in position on a support;

Fig. 2 is a vertical section taken on a line substantially corresponding to line 2—2 of Fig. 1;

Fig. 3 is a transverse vertical section taken on a line substantially corresponding to line 3—3 of Fig. 2 and illustrates a jar in inverted position in the device and before longitudinal pressure has been applied thereto;

Fig. 4 is a sectional view similar to Fig. 3 but illustrates the parts in clamped position after longitudinal or axial pressure has been applied;

Fig. 5 is an elevational view, partly in section, showing another form of my invention.

Referring to the drawings in detail, the embodiment illustrated in Figs. 1 to 4 comprises a base 1 which may be of any suitable material but is preferably of comparatively rigid sheet metal and provided with a downwardly and rearwardly extending bracket portion 2. The bracket portion 2 is provided with a thumb screw 3 having a suitable handle 4 thereon whereby the bracket may be secured to a table top or shelf 5, as illustrated. It will, of course, be understood that the device may be fastened either on the top of a table or shelf 5, as illustrated, or it may be secured underneath, thereby merely inverting the operation of the can therein.

The bracket 1 may be provided with outwardly extending ears 6 to which are secured inwardly extending upwardly inclined springs 7. Semi-circular cup-shaped jaws 8 are secured to the inner ends of the springs 7 in any suitable manner, as by rivets 9. Each of the jaws 8 may be preferably provided with a lining 10 formed of a suitable resilient cushioning material, preferably soft rubber, and secured to the jaws in any suitable manner.

The lining 10 comprises a comparatively thick side wall clamping portion 11 and a floor portion 12. The inner surface of the wall portion 11 may be knurled or otherwise roughened, as shown at 13, to increase the gripping action on the can cover. The floor portion 12 provides a suitable cushioning effect against the downward pressure of the can thereon and prevents any metallic part from coming in contact with and injuring the can cover.

In operation, a can or jar 14 is provided with the usual gasket or so-called "rubber" 15, and the usual screw cover 16 may be screwed thereon by hand. The can is then inverted between the jaws, as illustrated in Fig. 3, and pressed downwardly. The downward pressure against the springs 7 causes an arcuate lateral movement of the jaws to snugly grasp the can cover.

The comparatively thick walls of the linings 10 and the resilience of the springs 7 provide a very desirable flexibility in the operation of the device. That is, the can is not held rigidly in the device, although the cover is securely gripped, and, therefore, the longitudinal operating movement need not be on the exact vertical axial line. This is of considerable importance in preventing injury to the cover or can when turning the can during the sealing operation.

If desired, the base 1 and the springs 7 may be formed of a single piece of resilient material and the springs may be suitable tongues sheared or otherwise formed integral with the base.

The construction shown in Fig. 5 operates on a principle similar to that disclosed in Figs. 1 to 4, inclusive, but in Fig. 5 the apparatus is shown for gripping not only the screw cap but also the container to which the screw cap is applied. That part of the apparatus which grips the container itself comprises a flat base 16ª which may rest on a suitable support 17 and be secured thereto, if desired, and a pair of clamping jaws 18 pivotally mounted on the base 16 at 19 and 20, respectively, so that when the container 14 is pressed downwardly, the cushion lining 11 of the jaws will move inwardly to grip the sides of the receptacle 14 firmly to hold it against rotation. The jaws and lining may, in general, be similar to those previously described. Suitable counterweights 21 may be provided to return the jaws to their open position when the container is removed. That part of the apparatus for use in gripping the screw cap comprises a handle member 22 having two handle portions 23, and a pair of gripping jaws 24 pivotally mounted on the handle member at 25 and 26, respectively, these gripping jaws being, in general, similar to the gripping jaws previously described. The gripping jaws are provided with suitable stop fingers 27 for engagement with the handle, to prevent the jaws from dropping down too far when the handle is removed from the cap.

In using this apparatus, the container is placed in the position shown in Fig. 5, so as to be seated in the lower clamping jaws 18, the upper clamping jaws 24 are placed in position, as shown in Fig. 5, the operator presses downwardly on the handle to cause both pairs of jaws 18 and 24 to close, the lower pair 18 snugly gripping the container or receptacle and the upper jaws 24 snugly gripping the screw cap 16, and the cap is then loosened or tightened as desired by rotating the handle member 22 in the proper direction.

It will be apparent that modifications may be made by those skilled in the art without departing from the spirit and scope of the invention. It is therefore desired that the invention be limited only by the prior art and the scope of the appended claims.

Having thus described this invention, what is claimed and desired to be secured by Letters Patent is:

1. Apparatus for use with container covers comprising a base arranged to be secured to a support, a pair of oppositely disposed sheet metal springs secured to said base at their outer ends, jaws secured adjacent the inner ends of said springs whereby the jaws may be arcuately moved by longitudinal pressure thereon.

2. Apparatus for use with container covers comprising a pair of oppositely disposed jaw members, resilient means supporting each of said jaw members in a position to permit the insertion of a container cover therebetween, a base to which one end of each of said resilient supporting means is secured, said jaw members being arranged to snugly clamp said covers when axial pressure is applied to said jaws.

3. Apparatus for use with container covers comprising a base, inwardly and upwardly extending oppositely disposed spring members with their outer ends secured to said base and having their inner ends arranged for arcuate movement, jaw members secured to the free ends of said springs and arranged to normally freely receive a container cover therebetween, said jaws being arranged to clamp said cover snugly therebetween upon axial pressure of the cover in said jaws.

4. Apparatus for use with screw cover containers comprising a base, jaws supported on said base for relative movement, and resilient means normally retaining each of said jaws in container-receiving position and operable by pressure on a container inserted therein to enable said jaws to snugly clamp said cover, one end of each of said resilient means being secured to said base, said resilient means being arranged to reopen said jaws against the weight of said container when said pressure is removed.

5. Apparatus for use with a container, which container comprises a receptacle member and a screw cover member for the receptacle member, one of said members having a substantially cylindrical portion coaxial with the screw threads and a substantially flat portion extending transversely with respect to said axis, said apparatus comprising jaws for engaging and gripping said cylindrical portion on opposite sides of its axis, and means engageable with said flat portion whereby relative axial movement of the apparatus with respect to the engaged member will cause the jaws to move toward each other to grip the cylindrical portion of the engaged member, said jaws being respectively mounted for swinging movement about spaced axes, the distance of which from each other is greater than the diametral distance between the gripping portions of the jaws.

6. Apparatus for use with a container, which container comprises a receptacle member and a screw cover member for the receptacle member, said apparatus comprising jaws for engaging one of said members on opposite sides of the axis thereof, and spring means for mounting said jaws for swinging movement axially and inwardly about axes on opposite sides of the axis of the engaged member upon relative axial movement of the apparatus with respect to the engaged member whereby the jaws are caused to move toward each other to grip the sides of the engaged member.

ALFRED B. CUNARD.